United States Patent [19]

Uchida et al.

[11] Patent Number: 5,236,203
[45] Date of Patent: Aug. 17, 1993

[54] SPLIT-TYPE GASKET

[75] Inventors: Tadamasa Uchida; Kowa Fukushima, both of Saitama; Yasushi Morita, Tokyo, all of Japan

[73] Assignee: Tokyo Gasket Co., Ltd., Kawajima, Japan

[21] Appl. No.: 879,006

[22] Filed: May 6, 1992

[30] Foreign Application Priority Data

May 17, 1991 [JP] Japan .................................. 3-035001
May 17, 1991 [JP] Japan .................................. 3-035003

[51] Int. Cl.$^5$ .............................................. F16J 15/10
[52] U.S. Cl. ................................ 277/192; 277/199; 277/235 B
[58] Field of Search ............. 277/180, 192, 199, 227, 277/235 B

[56] References Cited

U.S. PATENT DOCUMENTS

| | | | |
|---|---|---|---|
| 1,502,524 | 7/1924 | Price, Jr. | 277/199 |
| 1,986,465 | 2/1935 | Dempsey | 277/199 |
| 2,768,036 | 10/1956 | Greenough | 277/199 |
| 3,175,832 | 3/1965 | Carrell | 277/199 |
| 3,231,289 | 1/1966 | Carrell | 277/199 X |
| 3,438,117 | 4/1969 | Engleman | 277/199 X |
| 3,583,711 | 6/1971 | Engleman | 277/199 |
| 3,738,670 | 6/1973 | Jelinek et al. | 277/199 |
| 4,293,135 | 10/1981 | Wallace | 277/199 X |
| 4,572,522 | 2/1986 | Smagatz | 277/235 B X |
| 4,580,793 | 4/1986 | Bronson | 277/199 |
| 4,690,413 | 9/1987 | Adkins | 277/199 |
| 5,149,108 | 9/1992 | Leiszter | 217/235 B X |
| 5,149,109 | 9/1992 | Jelinek et al. | 277/199 |

FOREIGN PATENT DOCUMENTS

15077 of 1893 United Kingdom ................. 277/227

Primary Examiner—William A. Cuchlinski, Jr.
Assistant Examiner—Scott W. Cummings
Attorney, Agent, or Firm—Beveridge, DeGrandi, Weilacher & Young

[57] ABSTRACT

A split-type gasket is disclosed which is free from leakage and requires no increased manhours in assembling, for a large sized gasket made up in ring form with a soft material, such as oil pan gasket. The gasket is provided with a joint connecting end configured by a projecting connector formed in a concentric circle with a bolt hole, and by a mating end having a recess which is so formed as to be fitted by the foregoing projecting end. The joint configuration of a projecting end composed of circular arcs connected in an S-shaped curve, a planar surface and a circular arc, and by a recess which is so formed as to be fitted with the foregoing projecting end is such that the distance between the summit of the projecting end and bolt hole center located near said projecting end is limited to a maximum of 23% of the distance between adjacent bolt holes of the gasket.

20 Claims, 8 Drawing Sheets

SPLIT-TYPE GASKET

BACKGROUND OF THE INVENTION

The present invention relates to a large-sized split-type gasket in a ring shape configuration and made of a soft material. The gasket of the invention can be used, for example, as an oil pan gasket applied between the contacting surfaces of the cylinder block and oil pan of an engine.

As is generally known, with regard to a gasket made from a sheet of an asbestos containing soft material, for example, the gasket article can be punched out at a stroke with a punch die. To reduce the pollution problem, a soft material free from asbestos is recommended. However, such asbestos-free materials have a high unit price which pushes up the cost of the gasket. As a measure taken against this rise in cost, for ring-shaped gaskets, attempts have been made to reuse the inside residue which has been punched out in ring form. Although, for example, it is known to form a gasket into a split type configuration and apply liquid gasket to the junctions during assembling, adhering the sections with a lower contact pressure allows leaks to arise easily, and is also troublesome, increasing the number of manhours required for this job.

Although the technology to connect a set of split gaskets through a piece which has a bolt hole and is formed with a different material is also commonly known, a combination of different materials creates special problems such as the selection of gasket materials and thickness, control of contact pressure and clamping force of bolts, etc., and the presence of connecting areas on both sides of the piece leads to the problem of many leaking places.

SUMMARY OF THE INVENTION

An object of the present invention is to provide a split-type gasket which can be simply constructed without increased manhours and leaks.

Thus in accordance with a feature of the invention, there is provided a split-type gasket having two parallel straight sections and two U-shaped sections. Each of said sections has an end connecting means adapted to mate with another end connecting means of an adjacent gasket section.

BRIEF DESCRIPTION OF THE DRAWINGS

Embodiments of the present invention are illustrated by the accompanying drawings wherein.

DETAILED DESCRIPTION OF INVENTION

Figure 2:
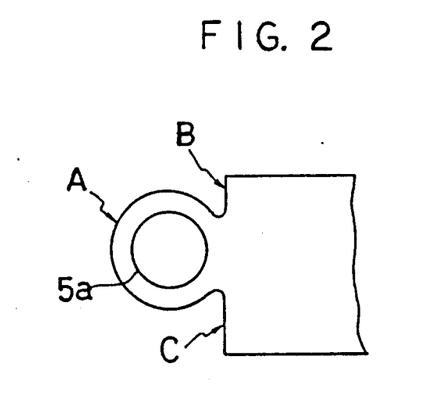
FIG. 2 is a plane view of one end section of the gasket showing the joint with the ring shape connection.
Figure 3:
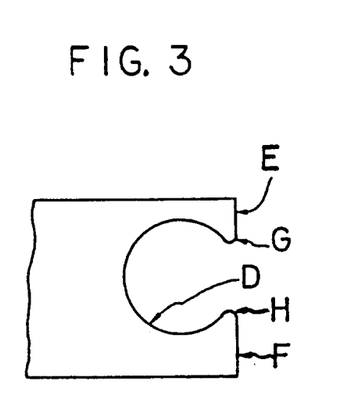
FIG. 3 is a plane view of the opposite end of the gasket section showing the mating configuration intended to mate with a ring shaped connection as shown in FIG. 2.

In achieving the above and other objects, one feature of the present invention resides in a split-type gasket 1 made up of a plurality of sections 2,3,4 and 5. Two parallel straight sections 2 and 3, and two U-shaped end sections 4 and 5, make up the preferred gasket of the invention. Each of the ends of each of the sections 2,3,4, and 5 have a joint connection which is adapted to fit and mate with the end of the adjacent gasket sections. One end of one of the gasket sections is shown in FIG. 2 and is a ring shaped from of a soft material; that is, the gasket is configured at one end by a ring shaped projecting connector A which juts out and and has formed therein a bolt hole as a concentric circle 5a and is connected to the remainder of the gasket at shoulders B and C. As shown in FIG. 3 the end of the gasket opposite the end shown in FIG. 2 has formed therein the recess D which is shaped so as to fit and mate with the foregoing jutting portion A. The intermediate projecting portions G and H and planar surfaces, E and F are so formed as to fit with and mate with shoulders B and C, respectively, of the end of the gasket section shown in FIG. 2.

Figure 7:
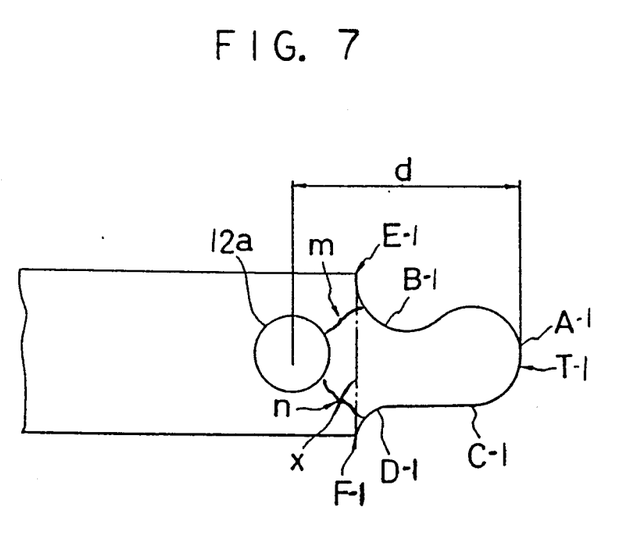
Fig. 7 is a plane view of one end of the gasket section with a connection configuration corresponding to the joint shown in FIG. 6.

In another embodiment shown in FIG. 7, the present invention provides a split-type gasket having formed therein at one end a connecting section having a circular hole 12a and a projecting end which has a jutting out portion composed of circular arcs A-1 and B-1 connected in an S-shaped curve, planar surface C-1 and circular arc D-1 near the bolt hole 12a. The mating end, shown in FIG. 8 has circular arcs G-1 and H-1 corresponding to the foregoing circular arcs A-1 and B-1, planar surface K-1 and circular arc L-1 corresponding to planar surface C-1 and circular arc D-1, respectively, so that distance d between summit T-1 of the foregoing jutting portions and the bolt hole center may fall within 23% of the distance between adjacent bolt holes of the gasket, and a straight line connecting points E-1 and F-1 where the foregoing circular arcs B-1 and D-1 intersect either of the inside and outside edges of the ring-shaped gasket, respectively does not cross or intersect the bolt hole. This is shown in FIG. 7.

In the split-type gasket having the configuration as described above, a connection can simply be made with a gasket of homogeneous material set around the bolt hole where the contact pressure is high and stable, and since jutting section A and projecting points G and H are linked together, fastening by bolt means avoids separation of the junction and reduces the leakage problem.

Also, in the split-type gasket having the configuration as described above, since the configuration is made so that distance d between summit T-1 of the jutting portions formed in the joint and the bolt hole may fall within 23% of the distance between adjacent bolt holes of the gasket, the contact pressure is sufficient to prevent leakage. In addition, since the configuration of the connection section is taken so that the straight line connecting points E-1 and F-1 where the foregoing circular arcs B-1 and D-1 intersect either of the inside and outside edges of the ring-shaped gasket, respectively, may not cross the bolt hole, the distances m and n between the bolt hole and circular arcs B-1 and C-1 are sufficient to maintain the strength of the connections. And since jutting section A-1 (FIG. 7) and recess G-1 (FIG. 8) are so configured as to mate with each other and thereby be linked together, fastening by means of a bolt through bolt hole 12a avoids separation of the stable joint and leakage.

If the distance d between summit T-1 of the foregoing jutting section A-1 and the bolt hole center exceeds 23% of the distance between adjacent bolt holes of the gasket, the contact pressure of the joint becomes too low and leakage is at to arise, and if the straight line connecting the foregoing points E-1 and F-1 intersects the bolt hole, distances m and n between the foregoing bolt hole and circular arcs B-1 and C-1 decrease and the strength of these sections becomes too low, causing breakage, and resulting in potential leaking.

Figure 1:
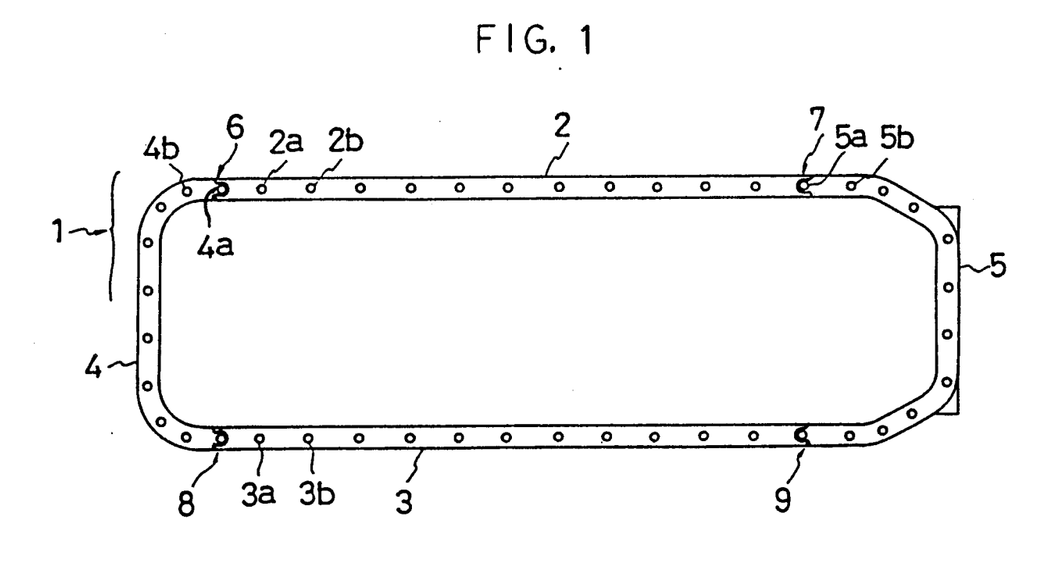
FIG. 1 is a plane view of an embodiment of the present invention.

As illustrated in FIG. 1, gasket 1 consists of straight sections 2 and 3 which are formed as a belt with U-shaped bent sections 4 and 5. The gasket is shown to be rectangular, but it can be any convenient shape. In addition, straight section 2 and 3 and bent sections 4 and 5 are provided with bolt holes 2a, 2b, * * *, 3a, 3b, * * *, 4a, 4b, * * *, and 5a, 5b, * * * respectively. These straight sections 2 and 3 and bent sections 4 and 5 are connected together at joints 6, 7, 8 and 9.

FIGS. 2 and 3 illustrate making connecting ends of the gasket joints. In one of them, shown in FIG. 2, jutting end portion A is formed in a concentric circle with bolt hole 5a and smoothly connects to planar edges or shoulders B and C with small circular arcs. At a mating end of the gasket joint, shown in FIG. 3, D is so formed in a circular arc as to be fitted for a mate with jutting portions A and planar surfaces E and F smoothly form projecting points G and H to fit into contacting connection with shoulders B and C.

Figure 4:
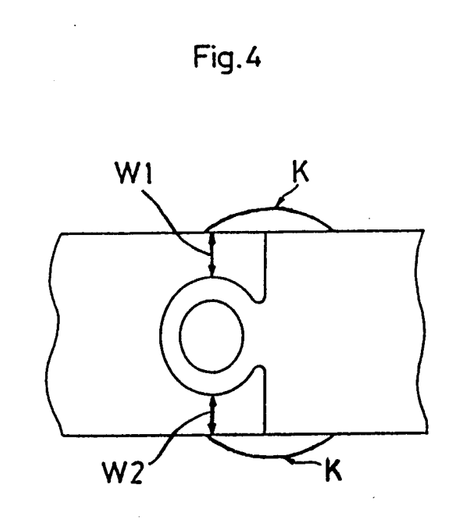
FIG. 4 is a plane view of an another embodiment of joint showing the two mating connections together.
Figure 5:
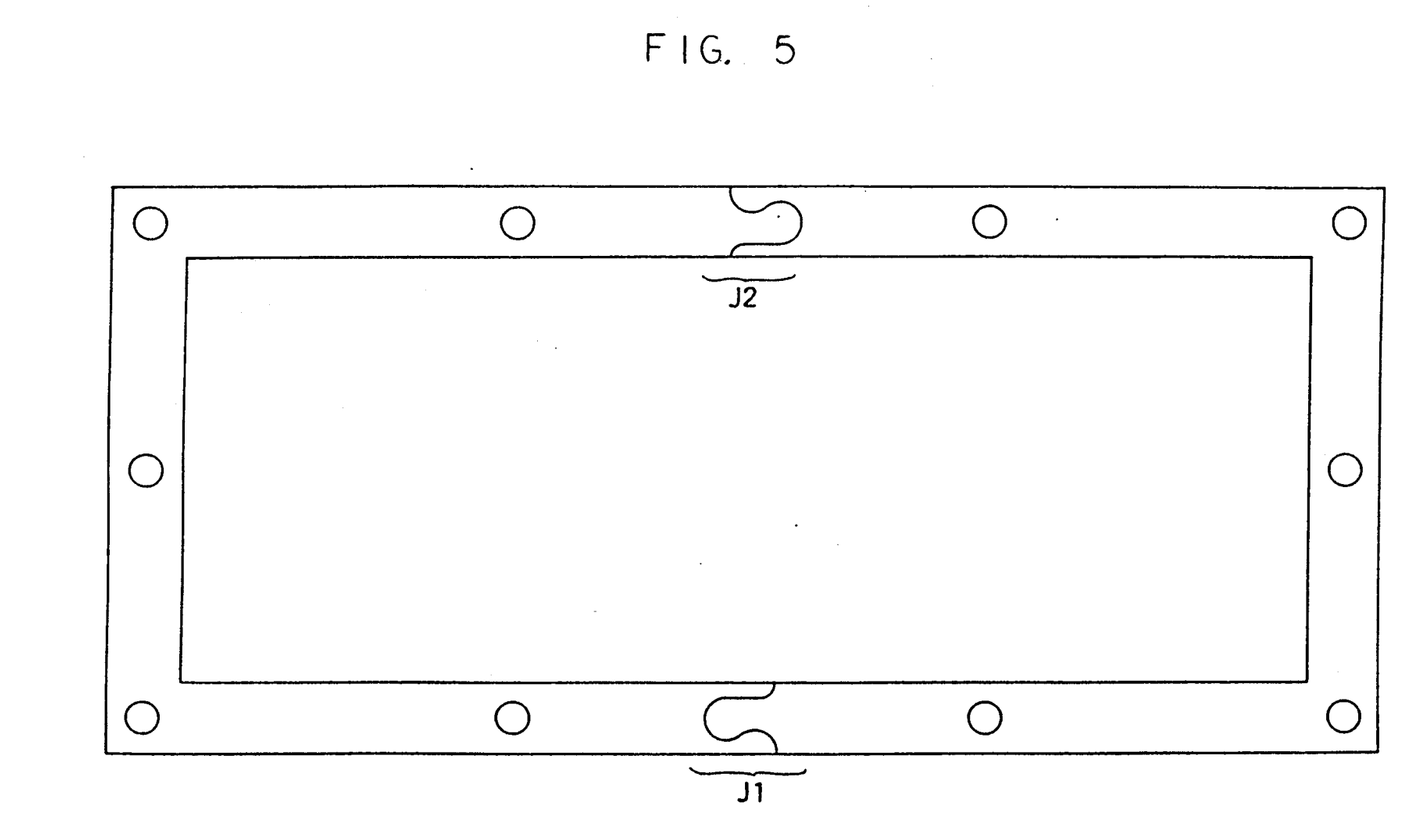
FIG. 5 is a plane view of an example of prior art gasket connections.

Therefore, once a set of gaskets is used for its intended purpose and is placed on the mounting plane with joints 6–9 connected, bolts are fastened through bolt holes 2a * * *, 3a * * *, 4a * * *, and 5a * * *, even in joints 6–9, no separations arise with jutting section A and projecting points G and H linked together. In addition, when the gasket configuration is fabricated with homogeneous material the result is a stabilization of the contact pressure, causing no leakage. Moreover, in the case of too narrow a width of W1 or W2, as illustrated in FIG. 4 and in FIG. 9, which is likely to cause a leak, both sides or one side of the bolt hole, as illustrated with lines K and K (FIG. 4), and m and m (FIG. 9), may be formed in a circular arc.

Figure 6:
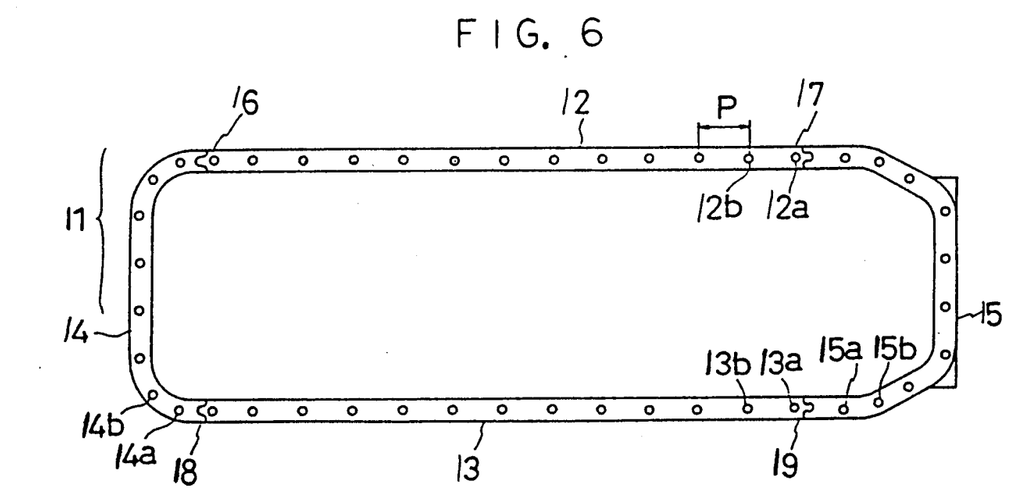
FIG. 6 is a plane view of an another embodiment of the present invention.

Another embodiment of the present invention is illustrated in FIG. 6, wherein gasket 11 consists of straight sections 12 and 13 which are formed into a belt configuration with U-shaped bent sections 14 and 15. In addition, straight sections 12 and 13 and bent sections 14 and 15 are provided with bolt holes 12a, 12b, * * *, 13a, 13b, * * *, 14a, 14b, * *, and 15a, 15b, * * *, respectively. These straight sections 12 and 13 and bent sections 14 and 15 are connected together at joints 16, 17, 18 and 19.

Figure 8:
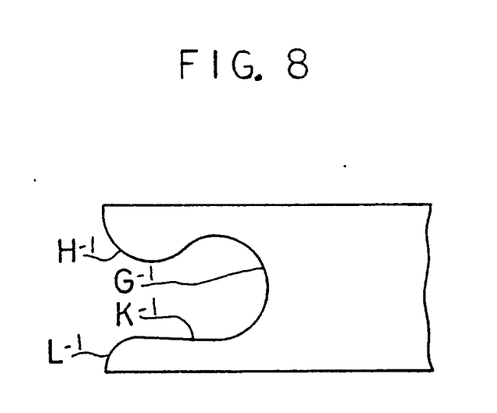
FIG. 8 is a plane view of the opposite end of the gasket section shown in FIG. 7.

FIGS. 7 and 8 exhibit these connecting junctions, and for example near bolt hole 12a which forms joint 17, there is a jutting out section formed by circular arcs A-1 and B-1 which are connected together in a S-shaped form, planar surface C-1 and circular arc D-1. And distance d between summit T-1 of the jutting section and the center of bolt hole 12a is so formed as to fall within 23% of the distance P between adjacent bolt holes of the gasket (for example, if p=80 mm, and ratio=20%, then: d=16 mm). In addition, chain line X connecting points E-1 and F-1 where circular arcs B-1 and D-1 intersect the outside or inside of the gasket is so formed as not to cross or intersect bolt hole 12.

As shown in FIG. 8 the corresponding recess is so formed as to make circular arcs G-1 and H-1, planar surface K-1 and circular arc L-1 fit into the foregoing circular arcs A-1 and B-1, planar surface C-1 and circular arc D-1, respectively.

Therefore, once the gasket is placed on the mounting plane with joints 16–19 connected, bolts are fastened through bolt holes 12a * * *, 13a * * *, 14A * * *, and 15a * * *, even in joints 16–19, the jutting section and recess as linked will not separate, and since the contact pressure is sufficient and the junction is formed of homogeneous material, no leakage problems will arise.

Figure 9:
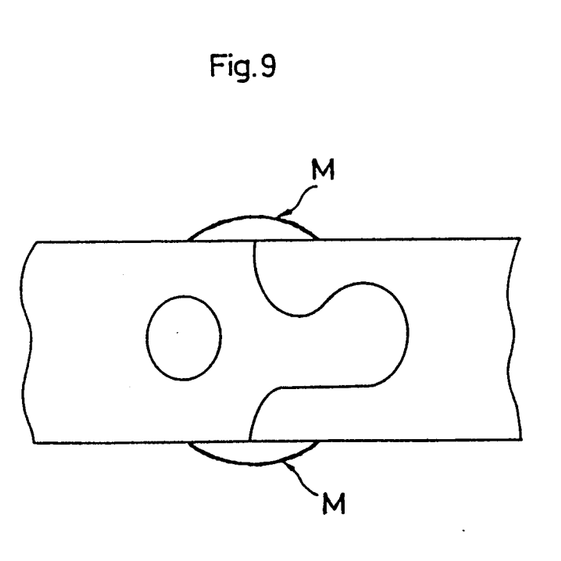
FIG. 9 is a plane view of an another embodiment of a joint connection according to the invention.

In the event that too narrow a width of section W1 or W2 occurs, as illustrated in FIG. 9, which is likely to cause a leak and/or gasket breakage, both sides or one side of the bolt hole may be formed in a circular arc, as illustrated with chain lines M and M.

The gasket of the present invention, having the configuration as explained above, causes no leakage even without liquid gasket sealing means thereby resulting in uninflated manhour labor costs and low material costs as well as improvement in yield of acceptable product.

It will be understood that any suitable gasket material can be used for purposes of the invention.

Further variations and modifications of the foregoing will be apparent to those skilled in the art and are intended to be encompassed by the claims appended hereto.

We claim:

1. A split-type gasket comprising
   two parallel straight sections and two U-shaped sections,
   said sections having a first end connecting means on second end thereof,
   said first connecting means being formed by a projection portion formed in a concentric circle with a bolt hole therein and having shoulder edges,
   said second connecting means being formed with a circular arclike recess which is so formed as to be mateable with said projecting portion, and having intermediate projecting points and edges which are so formed as to be fittable with said shoulder edges,
   said first connecting means of each of said sections being mated to said second connecting means of an adjacent section.

2. A split-type gasket according to claim 1, wherein at least one of said sections has an edge near said bolt hole formed in a circular arc, with said arc arcing away from said bolt hole.

3. A split-type gasket according to claim 1, wherein at least one of said sections has two opposite edges near said bolt hole each formed in a circular arc, with said arcs arcing away from said bolt hole.

4. A split-type gasket according to claim 1, wherein at least one of said sections includes a plurality of bolt holes.

5. A split-type gasket comprising:
   a plurality of sections, each of said sections having
      a plurality of bolt holes with a distance between adjacent bolt holes;
      a first connecting end having a projection with
         a plurality of connected circular arcs including first and second circular arcs connected in an S-shaped curve, said first circular arc terminating at a first edge of said section at a first intersection point, said second circular arc extending into a first planar surface; and
a third circular arc opposite said first circular arc located near one of said plurality of bolt holes, extending from said first planar surface, and terminating in a second edge of said section at a second intersection point; and
a second connecting end having a recess formed of a plurality of corresponding circular arcs including fourth and fifth circular arcs corresponding to said first and second circular arcs, a second planar surface corresponding to said first planar surface, and a sixth circular arc corresponding to said third circular arc, said second connected end being formed so as to be mateable with said projection,
said first connecting means of each of said sections being mated to said second connecting means of an adjacent section.

6. A split-type gasket according to claim 5, wherein said first connecting end is formed such that a distance between a tip of said projection and a center of said one of said plurality of bolt holes is within 23% of said distance between adjacent bolt holes.

7. A split-type gasket according to claim 5, wherein said first connecting end is formed such that a straight line connecting said first intersection point and said second intersection point does not cross said one of said plurality of bolt holes.

8. A split-type gasket according to claim 3, wherein at least one of said sections has said first edge near said one of said plurality of bolt holes formed in a circular arc, with said arc arcing away from said bolt hole.

9. A split-type gasket according to claim 5, wherein at least one of said sections has said second edge near said one of said plurality bolt holes formed in a circular arc, with said arc arcing away from said bolt hole.

10. A split-type gasket according to claim 5, wherein at least one of said sections has both said first edge and said second edge near said one of said plurality of bolt holes formed in a circular arc, with said arcs arcing away from said bolt hole.

11. A section of a split-type gasket comprising:
first end connecting means on a first end thereof, and a second connecting means on a second end thereof,
said first connecting means being formed by a projecting portion formed in a concentric circle with a bolt hole therein and having shoulder edges,
said second connecting means being formed with a circular arclike recess which is so formed as to be mateable with said projecting portion, and having intermediate projecting points and edges which are so formed as to be fittable with said shoulder edges, and
said first connecting means of each of said sections being mated to said second connecting means of an adjacent section.

12. A section of a split-type gasket according to claim 11, wherein said section has an edge near said bolt hole formed in a circular arc, with said arc arcing away from said bolt hole.

13. A section of a split-type gasket according to claim 12, wherein said section has two opposite edges near said bolt hole formed in a circular arc, with said arc arcing away from said bolt hole.

14. A section of a split-type gasket according to claim 11, wherein said section includes a plurality of bolt holes.

15. A section of a split-type gasket, comprising:
a plurality of bolt holes, having a distance between adjacent bolt holes;
a first connecting end having a projection with
a plurality of connected circular arcs including first and second circular arcs connected in an S-shaped curve, said first circular arc terminating at a first edge of said section at a first intersection point, said second circular arc extending into a first planar surface; and
an third circular arc opposite said first circular arc located near one of said plurality of bolt holes, extending from said first planar surface and terminating at a second edge of said section at a second intersection point; and
a second connecting end having a recess formed of a plurality of corresponding circular arcs including fourth and fifth circular arcs corresponding to said first and second circular arcs, a second planar surface corresponding to said first planar surface, and a sixth circular arc corresponding to said third circular arc, said second connected end being formed so as to mate with said projecting such that said first connecting end is mateable with said second connecting end,
said first connecting means of each of said sections being mated to said second connecting means of an adjacent section.

16. A split-type gasket according to claim 15, wherein said first connecting end is formed so that a distance between a tip of said projecting and a center of said one of said plurality of bolt holes is within 23% of said distance between adjacent bolt holes.

17. A split-type gasket according to claim 15, wherein said first connecting end is formed so that a straight line connecting said first intersection point and said second intersection point does not cross said one of said plurality of bolt holes.

18. A section of split-type gasket according to claim 15, wherein said section has said first edge near said one of said plurality of bolt holes formed in a circular arc, said circular arc arcing away from said bolt hole.

19. A section of a split-type gasket according to claim 15, wherein said section has said second edge near said one of said plurality of bolt holes formed in a circular arc, said circular arc arcing away from said bolt hole.

20. A section of a split-type gasket according to claim 15, wherein said section has both said first edge and said second edge near said one of said plurality of bolt holes formed in a circular arc, said circular arcs arcing away from said bolt hole.

* * * * *